Figure 1:
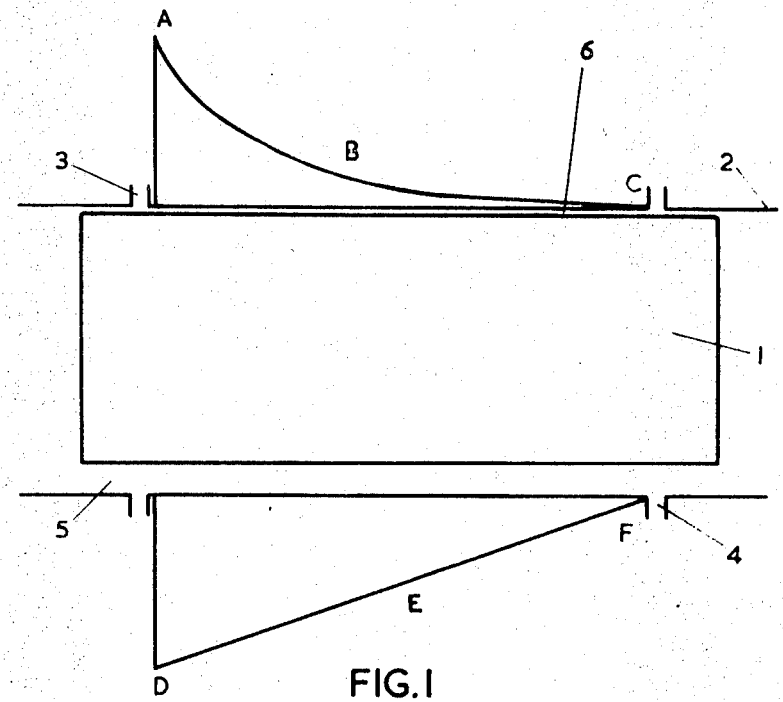

United States Patent

[11] 3,538,815

| [72] | Inventors | Michael E. Clarke<br>Kingston;<br>Bryan Morrell, Tadworth, England |
|---|---|---|
| [21] | Appl. No. | 817,297 |
| [22] | Filed | April 17, 1969<br>Continuation of application Ser No.<br>656,787, July 28, 1967, abandoned |
| [45] | Patented | Nov. 10, 1970 |
| [73] | Assignee | The British Oxygen Company Limited<br>a British Company |
| [32] | Priority | Aug. 4, 1966 |
| [33] | | Great Britain |
| [31] | | 35,045/66 |

[54] RECIPROCATING PISTON ENGINE
2 Claims, 5 Drawing Figs.

[52] U.S. Cl. .................................................. 92/127,
123/193, 184/1, 184/5, 184/6, 184/18, 184/24,
308/5
[51] Int. Cl. ...................................................... F01n 1/00,
F01b 31/10, F01m 9/00
[50] Field of Search ......................................... 123/193;
92/127; 184/18, 24, 6(N), 65, 1, 5; 308/5(Inquired)

[56] References Cited
UNITED STATES PATENTS

| 2,449,987 | 9/1948 | Hoffer. | | |
| 2,495,516 | 1/1950 | Foster. | | |
| 2,833,602 | 5/1958 | Bayer. | | |
| 2,907,304 | 10/1959 | Macks..................... | | 184/18UX |
| 3,153,987 | 10/1964 | Thoma. | | |
| 3,168,013 | 2/1965 | Williamson................ | | 308/5X |

FOREIGN PATENTS

| 498,084 | 1/1951 | Belgium ...................... | 184/18 |

Primary Examiner—Wendell E. Burns
Attorney—Townshend & Meserole

ABSTRACT: A cyclically reciprocating piston engine for effecting work producing expansion of a compressed gas, in which a piston is slidably mounted in a cylinder, to define an expansion space and to establish therein alternating high and low-pressure conditions. The cylinder is provided with at least three grooves disposed longitudinally along the cylinder wall, in such a way that they are not uncovered by the piston when low-pressure conditions exist in the expansion space. The grooves are in communication with the supply of compressed gas and are effective to provide a self-centering action for the piston. The grooves are of sufficiently small cross section such that the pressure of the compressed gas in the grooves falls rapidly in the direction of the expansion space. It is thereby possible to provide efficient self-centering for the piston by utilizing the high pressure of the compressed gas, without experiencing large leakage thereof into the expansion space.

RECIPROCATING PISTON ENGINE

This application is a continuation of my prior U.S. Pat. application Ser. No. 656,787 filed July 28, 1967 and now abandoned.

The present invention relates to a reciprocating piston engine and more particularly to an engine of the type comprising a piston slidably mounted in a cylinder and wherein by virtue of the movement of the piston high-pressure and low-pressure conditions are established in the cylinder. These conditions may be established at the one and the same end of the cylinder in alternating cycles, or they may exist simultaneously in the cycle on opposite sides of the piston. An engine of this type will be hereinafter referred to as a reciprocating piston engine of the type specified.

In piston engines of this type, especially small expansion engines and compressors used for refrigeration in the deep low-temperature field, it is of advantage to use a freely floating piston, that is to say a piston which is not guided in its movement by piston rings but by a layer of gas at pressure. The layer of gas may be conveniently established by arranging for a bleed of gas from the high-pressure end to be introduced into the clearance space between the piston and the cylinder at one or more points along the path of traverse of the piston. In one known arrangement, a series of circumferential grooves has been formed in the piston which, on the introduction of gas at pressure, serve as gas-lubricating elements performing a function akin to that of conventional lubricated piston rings.

Gas lubricated piston engines proposed hitherto have proved not entirely reliable in operation in so far as there is a tendency for the piston either to tilt about the central longitudinal axis of the cylinder or to be displaced laterally so that it rubs against the cylinder wall.

The tendency for the piston to tilt or to move laterally appears to be due to the fact that, by reason of the pressure differential which exists at the opposite ends of the piston, a pressure gradient is created in the lubricating layer of gas.

The pressure gradient moreover, varies with the width of the gap between the piston and the cylinder wall. The effect of this pressure gradient and of the variation in width of gap is illustrated in FIG. 1 of the accompanying drawings. Referring to the drawing a piston 1 is slidably located in a cylinder 2 having inlet ports 3 and outlet ports 4. The piston has assumed a position which is slightly off axis so that the gap 5 between the piston and cylinder wall on the lower side is larger than the gap 6 on the upper side.

Where the piston is very close to the cylinder wall the gas pressure falls rapidly from its high value at the inlet port to its low value at the outlet port. This is shown by the graph A B C indicating the gas pressure along the upper gap 6. Where there is a larger gap between the piston and cylinder wall the pressure gradient is substantially linear between the inlet and outlet ports. This is shown by the graph D E F indicating the gas pressure along the lower gap 5. It will be clear from these two graphs that a resultant force is exerted on the piston tending to increase the initial displacement of the piston from its correct central position until the piston is rubbing against the cylinder wall.

It is an object of the present invention to provide an engine of the type specified having improved gas lubrication bearing means for the piston which ensures a high degree of stability against tilt or lateral displacement of the piston.

According to the present invention a reciprocating engine of the type specified has gas-lubricating means for the piston comprising at least three grooves for lubricating gas extending longitudinally along the cylinder wall overlaying the path of traverse of the piston, the grooves being equally spaced circumferentially, the location in the axial direction and the longitudinal extent of the grooves being such that in the course of traverse of the piston the grooves do not become uncovered by the piston where low-pressure conditions exist in the cylinder.

In one arrangement the axial location and longitudinal extent of the grooves are such that in all positions of the piston in the course of traverse, the grooves remain partially uncovered by the piston where high-pressure conditions exist in the cylinder.

In another arrangement the axial location and longitudinal extent of the grooves are such that they remain covered by the piston in all positions thereof, and means are provided for conducting high-pressure lubricating gas to the grooves from a source external of the cylinder.

The grooves are sufficiently deep to enable the gas in them to cushion the piston in the cylinder, but the grooves are not so deep as to allow an excessive gas leakage from the gas inlet past the piston. Preferably the grooves are between one-quarter and three-quarters of the length of the cylinder, and are evenly spaced round the circumference of the cylinder to extend parallel to the longitudinal axis of the cylinder. However, the grooves may be inclined to the cylinder axis provided that any groove does not extend round more than one-third of the cylinders circumference. The grooves may be produced by any convenient method, such as for example by local etching of the cylinder surface.

Figure 2:
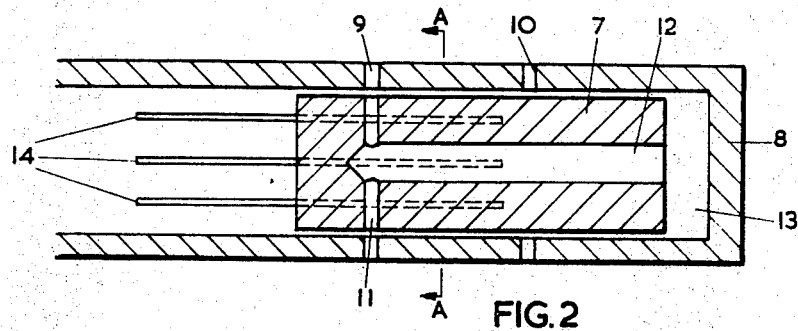
Figure 3:
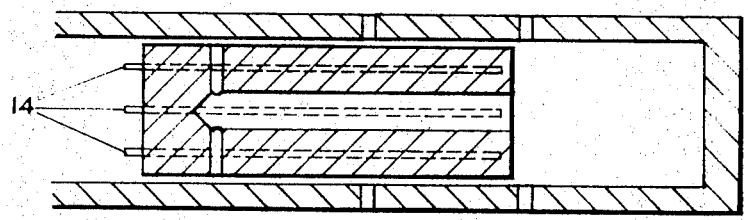
Figure 4:
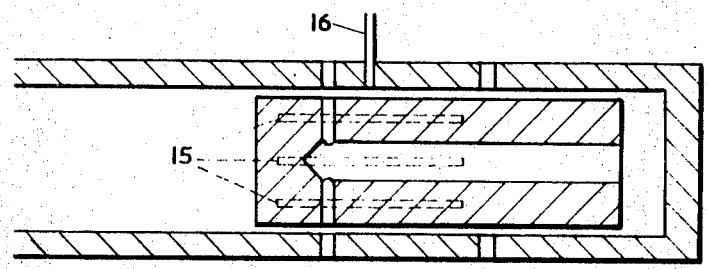
Figure 5:
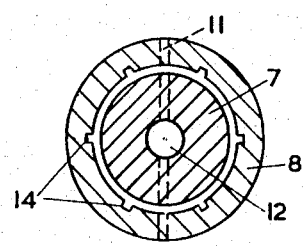

Two expansion engines for a small refrigeration machine will now be described by way of example with reference to the diagrammatic illustrations in FIGS. 2 to 4 of the accompanying drawings in which;

FIG. 2 shows a piston and cylinder assembly at the start of an operational cycle, FIG. 3 shows the same assembly at the end of an expansion stroke, FIG. 4 shows a modified piston and cylinder assembly, at the start of an operational cycle, FIG. 5 is a transverse section perpendicular to the longitudinal axis of the cylinder.

Referring to FIGS. 2, 3 and 4 a piston 7 is slidably mounted in a cylinder 8, having inlet ports 9 communicating with a source of compressed gas to be expanded, and outlet ports 10 through which expanded gas is removed. The piston and cylinder define an expansion space 13. Diametrically opposed radial bores 11 and a rearwardly extending axial bore 12 are located in the piston 7. The piston has a length and diameter of 1.25 inches, and the radial clearance between the piston and the cylinder wall is 0.0002 inches.

Six longitudinal equally spaced parallel grooves 14 are formed in the cylinder wall by local etching of the cylinder surface. Each groove is 0.010 inches wide, and has a depth between 0.0003 inches and 0.0007 inches.

At the point in the reciprocation cycle shown in FIG. 2 compressed gas enters through the inlets 9 and enters the expansion space 13 via the radial bores 11 and the rearwardly extending axial bore 12. The pressure of the compressed gas within the expansion space forces the piston 7 to the left. The radial bores 11 are thereby displaced from the inlet ports 9 and the supply of compressed gas to the expansion space is shut off. The compressed gas continues to expand until the position shown in FIG. 3 is reached. At such a position the expansion space 13 is in communication with the outlet port 10 and the expanded gas is vented therethrough. The piston is then returned to its initial position by a return means, (not shown). The return means, may, for example, comprise a compression spring or a rod eccentrically connected to a fly wheel. It will be observed, that during the reciprocation cycle alternating high and low-pressure conditions exist within the expansion space 13.

In order to allow free reciprocation of the piston, contact between the piston 7 and the cylinder 8 is opposed by means of the grooves 14. Throughout the reciprocation cycle compressed gas from the inlet ports 11 leaks between the piston 7 and the cylinder 8 into the grooves 14. In order to prevent high-pressure compressed gas flowing into the expansion space when low-pressure conditions exist therein, the grooves 14 are disposed and are of such length that they are not uncovered by the piston at the end closest to the expansion space, at any time during the reciprocation cycle. As may be seen, the grooves are of extremely small cross-sectional area and when the piston is in an axially central position, the pressure of compressed gas therein falls rapidly in the direction of the expansion space. The extremely low pressure of the gas at the expansion space end of the grooves means that there is only minimal leakage of compressed gas to the expansion space. Should the piston touch the cylinder wall the slight flow of gas out of the grooves in the region of contact will be stopped at the expansion space end. The pressure of the compressed gas in the grooves in the region of contact will, therefore, build up and become almost constant along their entire length, almost reaching the full supply pressure. The pressure of the compressed gas in the grooves opposite to the region of contact will, however, fall almost linearly between the inlet ports 11 and the outlet ports 10. The grooves in the region of contact will, therefore, exert a substantial force tending to return the piston 7 to an axially central position. It will be observed that the efficiency of the grooves in providing effective self-centering action, consistent with minimum wastage of compressed gas, is dependent almost entirely upon their cross-sectional area. If the grooves have too large a cross-sectional area the pressure of the compressed gas at the expansion space end of the groove will be high and there will be large wastage of compressed gas. If, however, the cross-sectional area of the grooves is too small, most of the pressure drop will occur close to the inlet port and an efficient self-centering action will not be achieved.

In the reciprocating piston engine shown in FIGS. 2 and 3 it is of course, essential that the gas pressure to the left of the piston is at least as high as the inlet pressure of the compressed gas, otherwise the compressed gas will leak continuously along the grooves 14 in a leftward direction. A construction such as is shown in FIGS. 2 and 3 is suitable for cylinders closed at both ends, in which the piston is returned for example by a spring or a gas cushion. For reciprocating piston engines having a cylinder open at one end the construction shown in FIG. 4 must be used. In the construction shown in FIG. 4, the grooves 15 are sufficiently short to remain covered at both ends throughout the reciprocation cycle. The reciprocating piston engine shown in FIG. 4 is also provided with an inlet conduit 16 connected to a supply of high-pressure gas. However, the inlet conduit 16 is not essential, for efficient self-centering action may be achieved utilizing the compressed gas to be expanded only.

We claim:

1. A cyclically reciprocating piston engine adapted to effect the expansion of a compressed gas during a reciprocating cycle comprising:
    a. a cylinder having at least one inlet port adapted to be connected to a supply of compressed gas to be expanded and at least one outlet port for the egress of expanded gas;
    b. a piston slidably mounted in the cylinder in such manner as to define therein an expansion space and to establish, by a reciprocating movement of the piston, alternating low and high-pressure conditions in the expansion space;
    c. means for shutting off the supply of compressed gas to the expansion space repetitively at a particular time in the reciprocation cycle; and
    d. at least three grooves extending longitudinally along the cylinder wall, and overlying the path of traverse of the piston, the grooves being continually in communication with the supply of compressed gas during the whole of the reciprocation cycle whereby said grooves become filled with compressed gas and are effective to provide a self-centering action for the piston, the grooves being substantially equally spaced circumferentially, the longitudinal extent of the grooves and the location of the grooves in the axial direction being such that in the course of traverse of the piston the grooves do not become uncovered by the piston during the period of the reciprocation cycle when low-pressure conditions exist in the expansion space, and the dimensions of the grooves being such that when the piston is disposed centrally with respect to the cylinder axis the compressed gas in each groove has a maximum pressure close to the inlet port and a minimum pressure close to the expansion space said minimum pressure being at least half the value of said maximum pressure.

2. A reciprocating piston engine as claimed in claim 1 wherein the length of the grooves and the location of the grooves in the axial direction are such that they remain covered by the piston in all positions thereof.